United States Patent
Kocsis et al.

(10) Patent No.: US 9,561,552 B2
(45) Date of Patent: Feb. 7, 2017

(54) TOOL MACHINE WITH AN OUTPUT SPINDLE THAT MOVES BACK AND FORTH

(75) Inventors: Timea Kocsis, Miskolc (HU); Tamas Koncsik, Sajoecseg (HU); Endre Zador, Ipswich (GB)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 13/984,214

(22) PCT Filed: Jan. 9, 2012

(86) PCT No.: PCT/EP2012/050210
§ 371 (c)(1),
(2), (4) Date: Nov. 26, 2013

(87) PCT Pub. No.: WO2012/107251
PCT Pub. Date: Aug. 16, 2012

(65) Prior Publication Data
US 2014/0082949 A1 Mar. 27, 2014

(30) Foreign Application Priority Data
Feb. 9, 2011 (DE) .................. 10 2011 010 745

(51) Int. Cl.
*B23D 51/16* (2006.01)
*B25F 5/02* (2006.01)

(52) U.S. Cl.
CPC ................ *B23D 51/16* (2013.01); *B25F 5/02* (2013.01)

(58) Field of Classification Search
CPC ......... B23D 51/01; B23D 51/16; B23D 51/10; B23D 51/08; B23D 49/10; B25F 5/02; A61B 17/148; B27B 19/002

USPC ........ 30/392, 393, 394, 277.4; 173/170, 114
See application file for complete search history.

(56) References Cited

U.S. PATENT DOCUMENTS

| | | | |
|---|---|---|---|
| 1,538,501 A * | 5/1925 | Amsden ........................ | 30/510 |
| 3,337,954 A * | 8/1967 | Robison ...................... | 30/277.4 |
| 3,432,702 A * | 3/1969 | Chambers ...................... | 310/50 |
| 3,995,703 A * | 12/1976 | Wanner .................. | B06B 1/183 173/105 |
| 4,280,359 A * | 7/1981 | Schmid et al. ................ | 73/123 |
| 4,726,430 A * | 2/1988 | Hendrikx et al. ............ | 173/109 |
| 4,770,254 A * | 9/1988 | Kominami .................... | 173/109 |
| 4,930,583 A * | 6/1990 | Fushiya et al. ............... | 173/109 |

(Continued)

FOREIGN PATENT DOCUMENTS

| CN | 1931490 A | 3/2007 |
|---|---|---|
| CN | 101044102 A | 9/2007 |

(Continued)

OTHER PUBLICATIONS

English Translation of FR1124672.*

(Continued)

*Primary Examiner* — Jennifer Swinney
(74) *Attorney, Agent, or Firm* — Maginot, Moore & Beck LLP

(57) ABSTRACT

A tool machine includes an output spindle that moves back and forth and includes a drive motor. The spindle and the motor are coupled to each other via a transmission system. A longitudinal face of the output spindle and a longitudinal face of the drive motor run adjacent to each other such that the drive motor lies next to the output spindle. A very compact configuration is thereby produced.

21 Claims, 4 Drawing Sheets

(56) References Cited

U.S. PATENT DOCUMENTS

| | | |
|---|---|---|
| 5,134,777 A | 8/1992 | Meyer et al. |
| 5,722,168 A * | 3/1998 | Huang .................. 30/161 |
| 6,286,611 B1 | 9/2001 | Bone |
| 6,449,851 B1 | 9/2002 | Bone et al. |
| 6,516,525 B2 * | 2/2003 | Liu .................. 30/519 |
| 7,216,433 B2 * | 5/2007 | Haas et al. .................. 30/393 |
| 7,404,451 B2 * | 7/2008 | Neumann .................. 173/109 |
| 7,818,887 B2 | 10/2010 | Saegesser et al. |
| 7,921,933 B2 * | 4/2011 | Hamano et al. .................. 173/122 |
| 2002/0178589 A1 * | 12/2002 | Wong et al. .................. 30/277.4 |
| 2003/0192191 A1 | 10/2003 | Wong |
| 2004/0143976 A1 | 7/2004 | Wheeler et al. |
| 2004/0237678 A1 | 12/2004 | Lagaly et al. |
| 2005/0236168 A1 * | 10/2005 | Lennartz .................. 173/109 |
| 2006/0005402 A1 | 1/2006 | Nottingham et al. |
| 2007/0074408 A1 * | 4/2007 | Zhang .................. 30/392 |
| 2009/0038164 A1 * | 2/2009 | Vitantonio et al. .................. 30/277.4 |
| 2009/0183887 A1 | 7/2009 | Baber et al. |
| 2009/0223071 A1 | 9/2009 | Alberti et al. |
| 2009/0277022 A1 * | 11/2009 | Limberg et al. .................. 30/392 |
| 2010/0162579 A1 | 7/2010 | Naughton et al. |

FOREIGN PATENT DOCUMENTS

| | | |
|---|---|---|
| CN | 101053303 A | 10/2007 |
| CN | 101663140 A | 3/2010 |
| EP | 1 738 851 A2 | 1/2007 |
| EP | 1 844 646 A2 | 10/2007 |
| FR | 1124672 * | 10/1956 |
| GB | 2 234 034 A | 1/1991 |

OTHER PUBLICATIONS

International Search Report corresponding to PCT Application No. PCT/EP2012/050210, mailed May 10, 2012 (German and English language document) (7 pages).
Photo_Black_Decker_CompactSaw_LPS7000.
Photo_Craftsman_14299_Nextec.

* cited by examiner

TOOL MACHINE WITH AN OUTPUT SPINDLE THAT MOVES BACK AND FORTH

This application is a 35 U.S.C. §371 National Stage Application of PCT/EP2012/050210, filed on Jan. 9, 2012, which claims the benefit of priority to Serial No. DE 10 2011 010 745.2, filed on Feb. 9, 2011 in Germany, the disclosures of which are incorporated herein by reference in their entirety.

The disclosure relates to a power tool, having a reciprocating motion output spindle according to the description below.

BACKGROUND

There are known motor-driven saber saws or handsaws, for example foxtail saws, which are driven by an electric motor and in which the saw blade executes a reciprocating, oscillating working motion.

US 2009/0223071 A1 and US 2010/0162579 A1 disclose power tools having a reciprocating-motion output spindle and a drive motor, which are coupled to each other via a transmission. The longitudinal axes of the drive motor and of the output spindle in this case enclose an obtuse angle. The drive motor, the output spindle and the handle are disposed in a star formation, as a result of which the power tool requires a relatively large amount of space. Accordingly, the upwardly projecting drive motor may obstruct the view of the item being cut.

U.S. Pat. No. 7,818,887 discloses a power tool having a reciprocating-motion output spindle and a drive motor, which are coupled to each other via a transmission, wherein the output spindle has a fastening portion for fastening a tool, wherein the drive motor has drive portion, which is connected to the transmission, and a first end, distant from the transmission. The drive motor is disposed in a handle of the power tool. The power tool is quite compact. However, the grip has to have a minimum circumference, so that it can accommodate the drive motor.

It is also known, for example from the Craftsman 14299 Nextec, that the grip and the longitudinal axis of the spindle are in alignment. The motor connected to the transmission extends at right angles to the grip and the longitudinal axis of the spindle.

U.S. Pat. No. 6,449,851 discloses a similar saber saw having a grip, motor, transmission and a spindle, wherein the longitudinal axes of the motor and of the spindle are disposed at right angles to each other. The grip extends almost at right angles to the motor, but is not in alignment with the spindle.

U.S. Pat. No. 5,134,777 discloses a foxtail having a grip, motor, transmission and spindle, wherein the longitudinal axes of the motor and of the spindle are disposed at right angles to each other. The grip extends almost parallelwise in relation to the longitudinal axis of the motor, but is slightly inclined. When the foxtail is in the horizontal position, the drive motor is oriented upward and may possibly obstruct the view of the item being cut.

A similar foxtail is known from US 2004/237678 A1, wherein the drive motor is oriented downward when the foxtail is in the horizontal position.

It is known, from the Black & Decker CompactSaw LPS7000, that the longitudinal axes of the motor and of the spindle are in alignment with each other, or extend parallelwise in relation to each other. The grip is positioned on the motor in the manner of a pistol.

Known from GB 2234034 and US 2006/0005402 A1 are electric knives in which the battery, motor, transmission and output spindle are disposed in series.

Known from U.S. Pat. No. 6,286,611 B1 and US 2004/143976 A1 are further so-called compact saws, in which the grip contains the motor, which, for its part, is oriented away from the output spindle.

Also known in addition are saber saws having a grip, a motor, a transmission and a spindle, which are all disposed in series, wherein the longitudinal axes of the motor and of the spindle are in alignment, or extend parallelwise in relation to each other.

SUMMARY

The disclosure is based on the object of creating a compact power tool through simple configuration measures. This object is achieved, according to the disclosure, with the features described below. The embodiments described herein specify expedient developments.

Provided for this purpose is a power tool, in particular a saber saw, having a reciprocating-motion output spindle and a drive motor, which are coupled to each other via a transmission, wherein a longitudinal side of the output spindle and a longitudinal side of the drive motor extend next to each other, such that the drive motor is disposed next to the output spindle.

An advantage of the power tool is that the drive motor is located in a region that does not obstruct the view of the item being cut.

The power tool according to the disclosure is well balanced. Depending on the configuration, the drive motor "draws" the saw slightly in the direction of the item being cut.

These effects are improved in that the output spindle has a fastening portion for fastening a tool, the drive motor has a drive portion connected to the transmission and has a first end distant from the transmission, and the first end of the drive motor that is distant from the transmission is disposed closer to the fastening portion than the drive portion connected to the transmission.

Since the longitudinal axis of the drive motor and the longitudinal axis of the output spindle intersect at an angle α on the side that is distant from the transmission, such that the drive motor and the output spindle are inclined such that the drive portion is at a greater distance from the output spindle than the first end of the drive motor, a greater stroke of the output spindle can be achieved.

Since the angle α is between 5° and 30°, in particular between 15° and 20°, and is preferably 17°, a particularly compact structural shape is obtained.

Preferably, the transmission comprises a wobble plate assembly, which is disposed on a transmission shaft that extends parallelwise in relation to the longitudinal axis of the drive motor, thereby enabling inexpensive realization.

Since the transmission shaft is located in a gap created by the drive motor and the output spindle, and is preferably mounted in a cantilevered manner, better use is made of the structural space.

Since the wobble plate assembly has a first portion, which is disposed around the transmission shaft, and a second portion, which engages in the output spindle, and the first and the second portion enclose an angle β, which is 90°−α, the stroke of the output spindle can be increased.

A particularly ergonomic shape is obtained in that the power tool has a handle that, with the output spindle, encloses an angle γ, which, in particular, is between 15° and 45°, preferably °30.

Since the first angle α and the angle γ are disposed in one plane and on one side of the output spindle, or since the drive motor is disposed beneath the output spindle, the power tool lies particularly well in the hand.

Preferably, a housing for a power tool is provided, having a receiving region for an output spindle, having a grip portion, having a bulged portion for accommodating a drive motor, which is located beneath the receiving region for the output spindle, wherein the receiving region and the bulged portion have an oval cross-sectional area that extends perpendicularly in relation to the output spindle and at least partially surrounds the drive motor and the output spindle.

BRIEF DESCRIPTION OF THE DRAWINGS

Further advantages and expedient embodiments are given by the description of the figures and the drawings. In the drawings.

DETAILED DESCRIPTION

In the figures, components that are the same are denoted by the same references.

Figure 1:
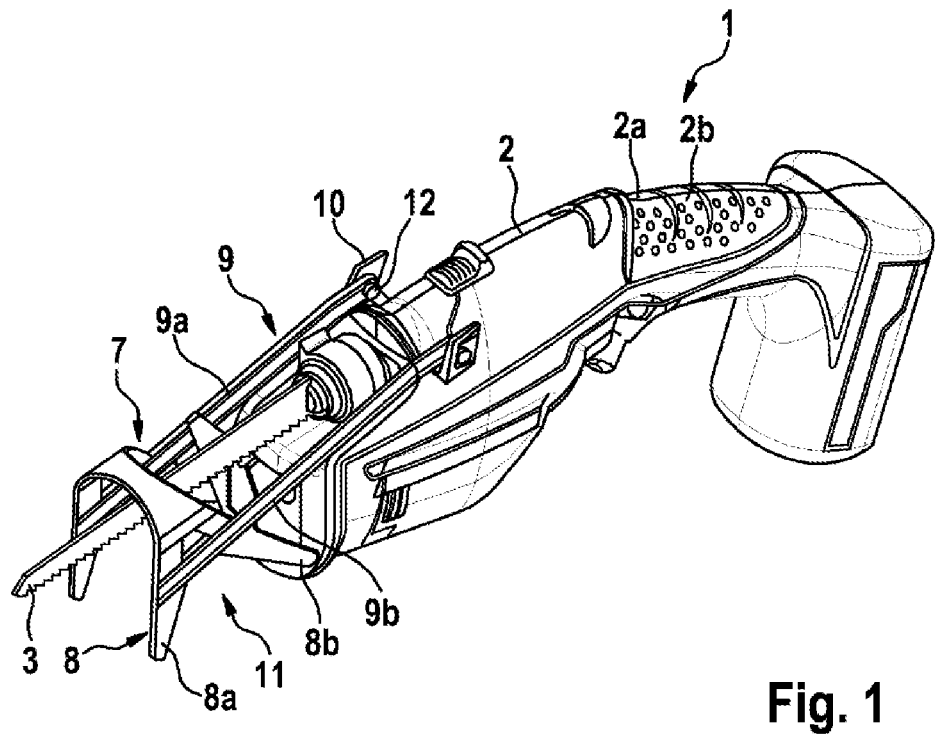
FIG. 1 shows a perspective representation of a saber saw, which is operated by an electric motor and, as a tool, has a saw blade that executes a linear, oscillating sawing motion, having a support device for receiving an object to be worked, wherein the support device is pivotally disposed on the housing of the power tool.
Figure 2:
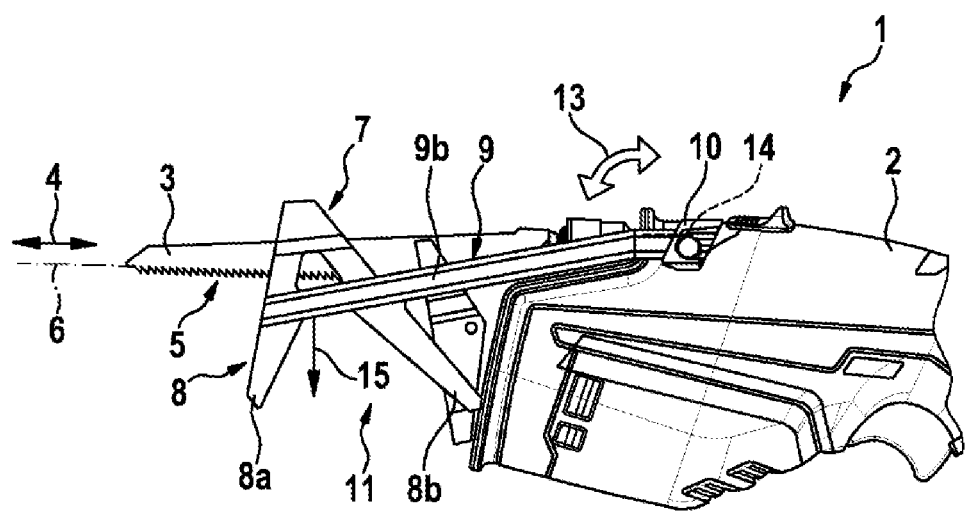
FIG. 2 shows the saber saw, including the support device, in a side view.

Shown in FIGS. 1 and 2 is a power tool, realized as an electric saber saw 1 (also called a foxtail saw or "reciprocating saw"), in the form of a sawing machine or device for straight, reciprocating-motion saw blades. The saber saw 1 is realized as a hand power tool, which, in a housing 2 consisting of two housing shells 2a, 2b, has an electric drive motor for driving a tool realized as a saw blade 3. As can be seen from FIG. 2, the saw blade 3 executes an oscillating, linear working motion, according to the double arrow 4, in which the saw teeth 5 of the saw blade 3, which are disposed in a saw-tooth line 6, are moved back and forth. The working motion 4 is effected along the saw-tooth line 6. Instead of the reciprocating motion, the saw blade can also execute an orbital motion.

As can additionally be seen from FIGS. 1 and 2, the saber saw 1 is provided with a support device 7, which comprises a support element 8 on a carrier part 9, as well as a fastening element 10 on the housing 2. The support element 8 is realized as a support angle, and has two support limbs 8a and 8b, which are disposed at an angle in relation to each other, open outwardly and delimit a receiving region 11 for receiving an item or object to be worked. As can be seen from the perspective representation according to FIG. 1, the support element 8 is realized in a U shape, wherein each limb of the U has two support limbs 8a, 8b having a receiving region 11 located therebetween.

The carrier part 9 comprises two carrier limbs 9a, 9b, which are each located on differing sides of the U-shaped support element 8, and are fixedly connected to the support element. On the side opposite the support element 8, the ends of the two carrier limbs 9a, 9b are pivotally connected to the fastening element 10, which is detachably disposed on the housing 2 of the saber saw 1. This embodiment enables the support device 7, with the support element 8 and the carrier part 9, to pivot about the axle 12 of the pivot joint between the fastening element 10 and the carrier limbs 9a, 9b, in the direction of pivoting 13 (FIG. 2).

As can also be seen from FIG. 2, laid around the axle 12 of the pivot joint between the fastening element 10 and the carrier limbs 9a, 9b there is a spring element 14, in the form of a torsion spring, which biases the carrier part 9, including the support element 8, in the initial position represented in FIG. 2. The spring element 14 generates a moment about the axis 12 that, at the level of the receiving region 11, acts as a force arrow 15 acting at least approximately perpendicularly in relation to the saw-tooth line 6 of the saw blade 3. To enable the support element 8 to be pivoted upward against the force of the spring element 14, a force must be applied contrary to the force arrow 15. This force is advantageously less than 10 N, for example 4 N to 9 N.

Figure 3A:
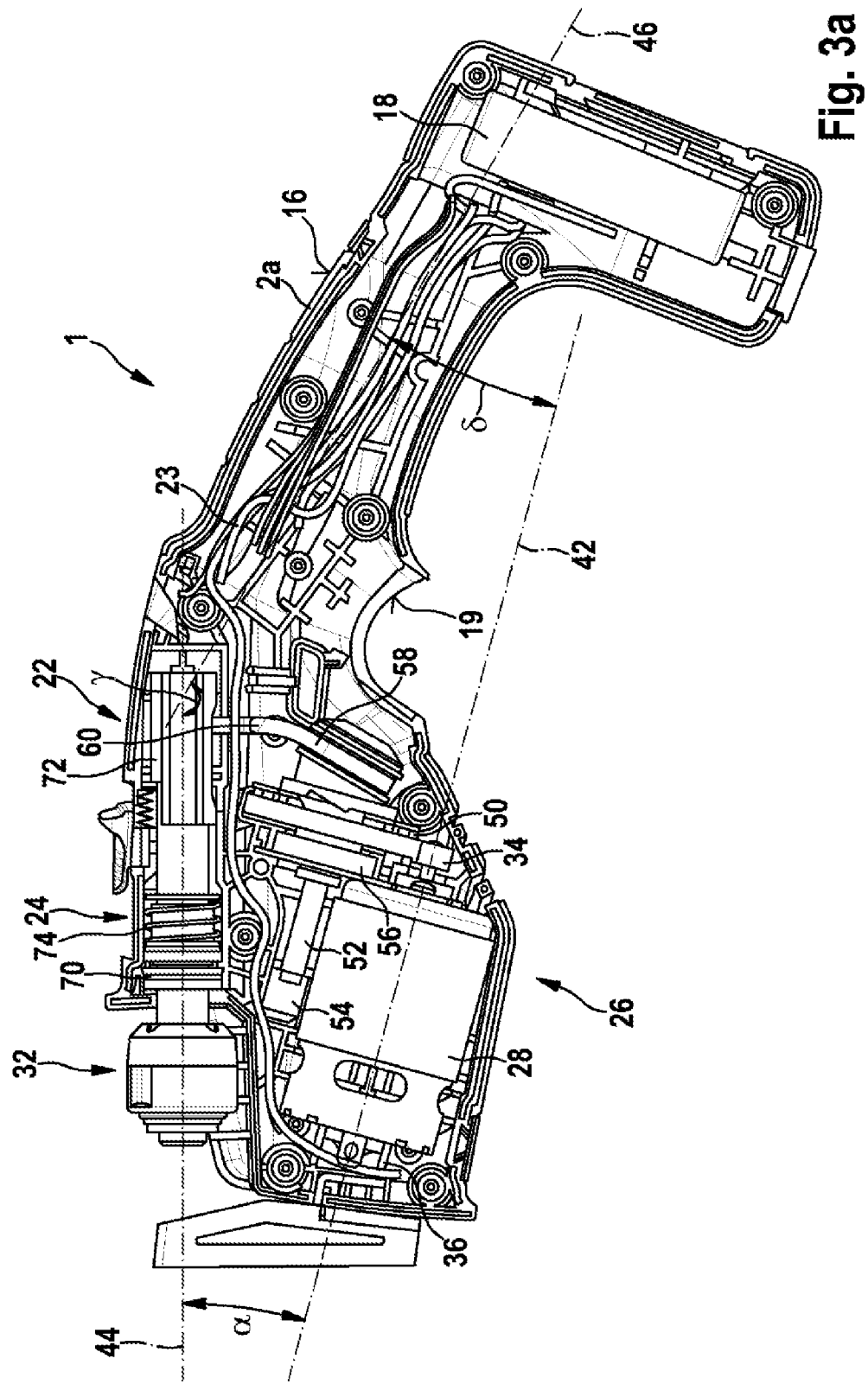
FIG. 3a shows a side view of the saber saw with some components, which are disposed in a housing shell.
Figure 3B:
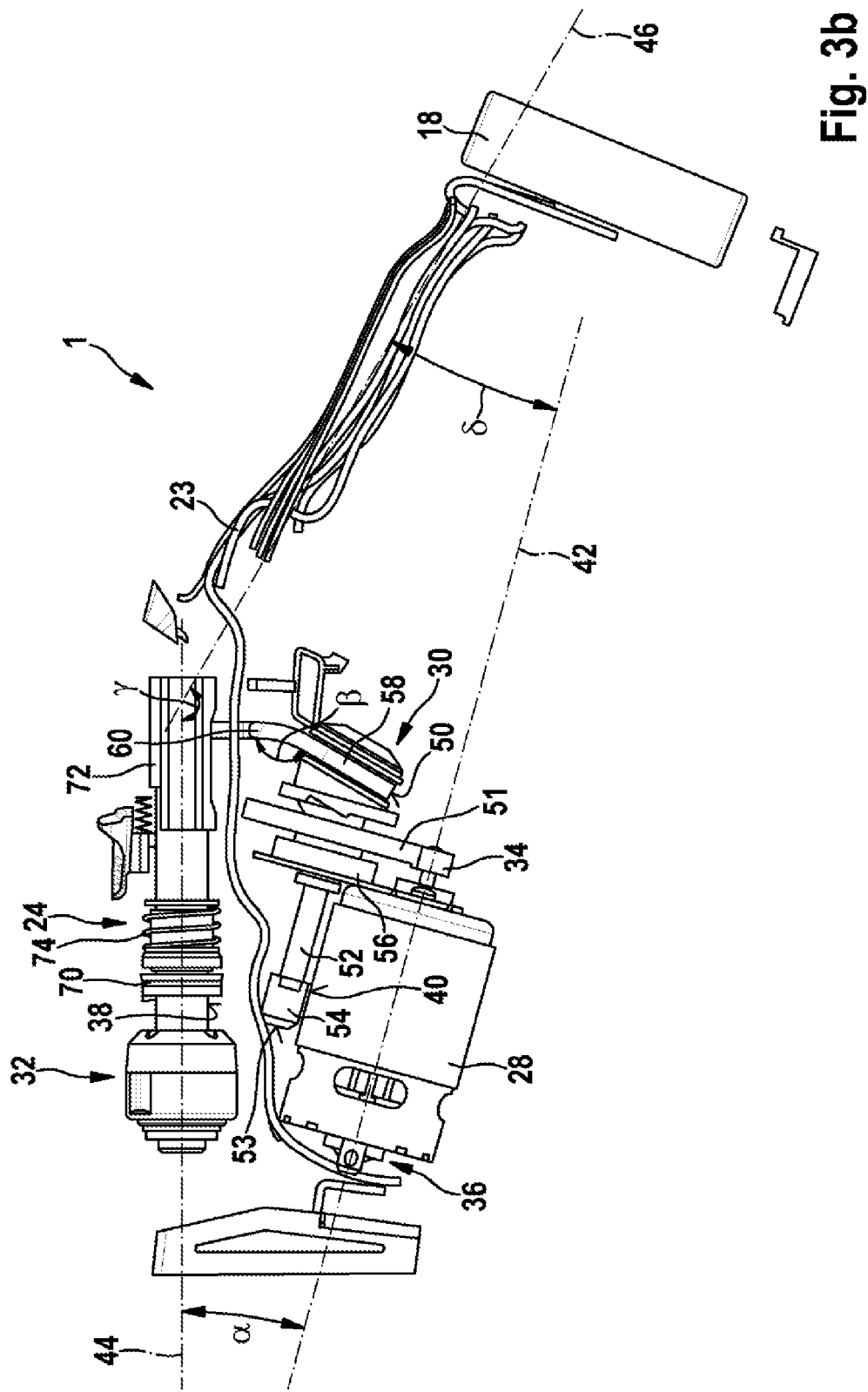
FIG. 3b shows the components from FIG. 3a without a housing shell.
Figure 4:
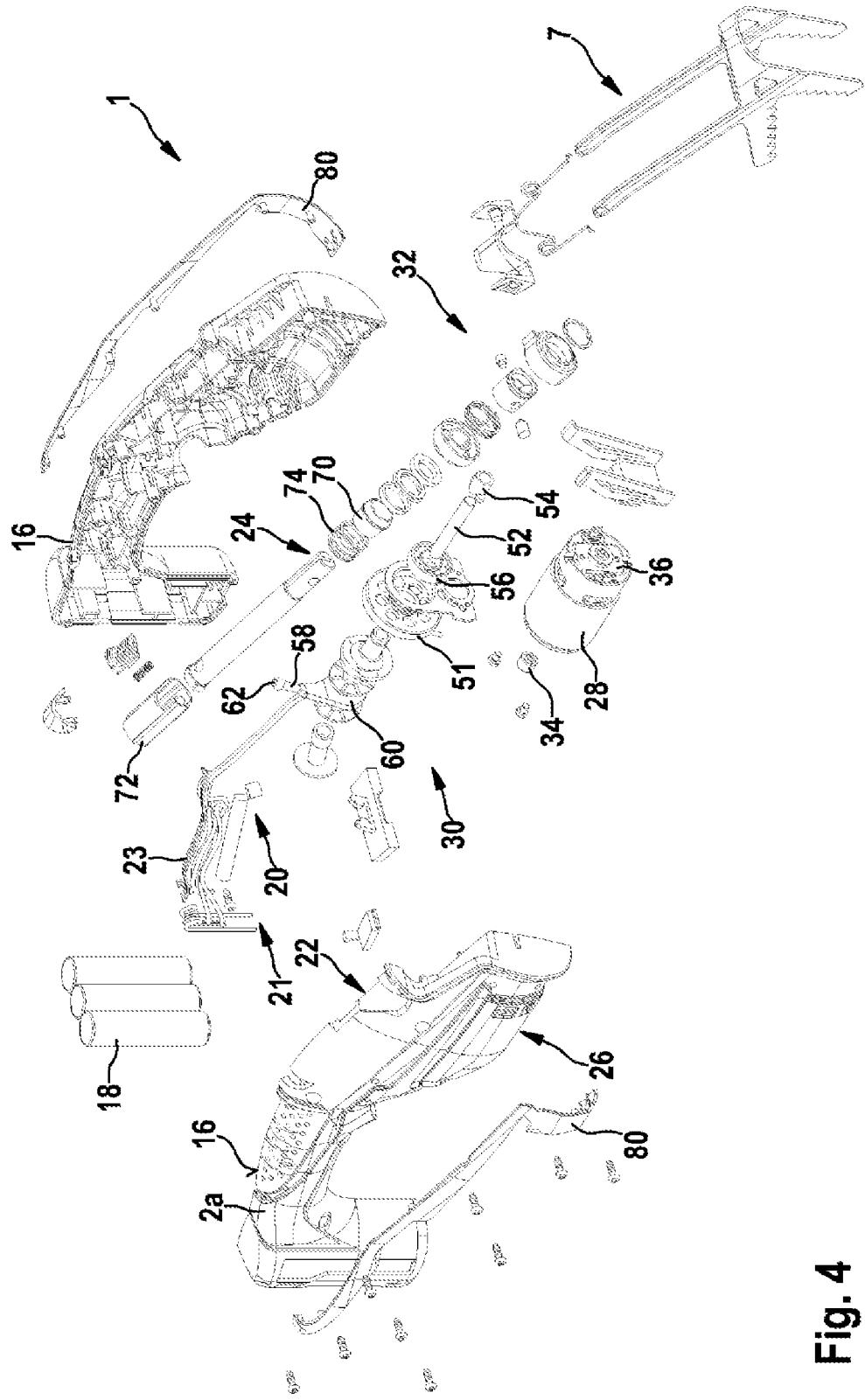
FIG. 4 shows an exploded representation of the saber saw.

FIGS. 3a, 3b and 4 show components and assemblies of the saber saw 1 that are disposed in the housing 2.

The housing 2 comprises a grip portion 16, disposed in one end of which there is a rechargeable battery 18, which, however, can also be realized as an exchangeable battery. Alternatively, however, a cable connection for a mains power supply cable can also be provided here. An opening 19 for an on/off switch 20 is also provided in the housing 2. An electronics assembly 21, by which the saber saw 1 is controlled, is actuated via the on/off switch 20.

At the end facing away from the battery 18, the housing 2 has a receiving region 22 for an output spindle 24. Under the receiving region 22, the housing 2 has a bulged portion 26 for accommodating a drive motor 28, which is located beneath the receiving region 22 for the output spindle 24. The receiving region 22 and the bulged portion 26 have an oval cross-sectional area that extends perpendicularly in relation to the output spindle 24 and surrounds the output spindle 24 and the drive motor 28. The battery 18, the on/off switch 20, the electronics assembly 21 and the drive motor 28 are connected to each other via cables 23.

The power tool, realized as a saber saw 1, additionally comprises a reciprocating-motion output spindle 24, which is coupled to the drive motor 28 via a transmission 30. A multi-part fastening portion 32, for fastening the saw blade 3, is provided at the end of the output spindle 24 that projects out of the saber saw 1.

The drive motor 28 has a drive portion, in the form of a pinion gear 34, which is connected to the transmission 30, and has a first end 36 distant from the transmission 30.

A longitudinal side 38 of the output spindle 24 and a longitudinal side 40 of the drive motor 28 extend next to each other, such that the drive motor 28 is disposed next to the output spindle 24. The first end 36 of the drive motor 28 that is distant from the transmission 30 is disposed closer to the fastening portion 32 than the pinion gear 34 connected to the transmission.

The longitudinal axis 42 of the drive motor 28 and the longitudinal axis 44 of the output spindle 24 intersect on the side that is distant from the transmission 30, and enclose an angle α, such that the drive motor 28 and the output spindle are inclined such that the pinion gear 34 is at a greater distance from the output spindle 24 than the first end 36 of the drive motor 28. The angle α is preferably 17°, wherein a range of between 15° and 20° is also good, and a range of from 5° and 30° is also adequate.

Extending along the grip portion 16 of the housing 2, or of the handle, is a longitudinal axis 46, which, with the longitudinal axis 44 output spindle 24, encloses an obtuse angle γ, which, in particular, is between 15° and 45°, preferably 30°. The first angle α and the obtuse angle γ are disposed in one plane and on one side of the spindle. As a result, the drive motor is disposed beneath the spindle, in particular when the saber saw is disposed horizontally.

The drive motor 28 and the output spindle 24, or the longitudinal axes 42 and 44 thereof, thus enclose an acute angle α. In addition, the handle and the output spindle 24 enclose an obtuse angle γ. Further, the handle and the drive motor 28, or the longitudinal axes 42 and 46 thereof, enclose an acute angle δ. A very compact arrangement of the assemblies is obtained as a result.

The transmission 30 comprises a wobble plate assembly 50, which is disposed on a transmission shaft 52 that extends parallelwise in relation to the longitudinal axis 42 of the drive motor 28. The transmission shaft 52 is located in a gap 53 created by the drive motor 28 and the output spindle 24, and is preferably mounted in a cantilevered manner. Provided for mounting for this purpose, on the one hand, is a plain bearing 54, which is disposed in the bulged portion 26 between the drive motor 28 and the output spindle 24. On the other hand, a ball bearing 56 is provided, which is likewise disposed in the bulged portion 26. It is understood that all essential components are held by complementary openings in the housing shells 2a, 2b. It is also conceivable, however, for a ball bearing to be disposed on the side of the wobble plate assembly 50 that is distant from the drive motor 28.

A toothed wheel 51, which is disposed in a rotationally fixed manner on the transmission shaft 52 and driven by the pinion gear 34, is provided to drive the wobble plate assembly 50.

The wobble plate assembly 50 has a first portion 58, which is disposed around the transmission shaft 52, and a second portion 60, which engages in the output spindle 24. The first and the second portion 58, 60 enclose an angle β, which is 90°−α.

Realized at the end of the second portion 60 is a ball head 62, which engages in an opening 64 in the output spindle 35. Owing to this arrangement, a quite large stroke of the output spindle 24 is achieved, despite the compact structural form.

The output spindle 24 is mounted in a front plain bearing 70 that is disposed over the drive motor 28, and a plain bearing 72 that is disposed on in the housing 2. The front plain bearing 70 is supported by means of a spring 74.

There are also cover strips 80 on the sides of the housing shells 2a, 2b. The housing shells 2a, 2b are mounted by means of screws 82.

Instead of a transmission having a wobble plate assembly, it is also possible to provide a bevel gear transmission, a wobble plate assembly being more favorable for production.

In addition to being realized as a saber saw, it is also conceivable for the output spindle to have a superimposed rotary motion, in addition to the stroke motion, such that the power tool is realized as a percussion drill.

The invention claimed is:

1. A reciprocating saw, comprising:
a reciprocating-motion output spindle having a spindle longitudinal axis; and
a drive motor having a motor longitudinal axis,
wherein the output spindle and the drive motor are coupled to each other via a transmission, the drive motor including a drive portion connected to the transmission and a first end distant from the transmission,
wherein a longitudinal side of the output spindle and a longitudinal side of the drive motor extend next to each other such that the drive motor is disposed next to the output spindle,
wherein the motor longitudinal axis and spindle longitudinal axis intersect at a first angle on a side that is distant from the transmission such that the drive motor and the output spindle are inclined such that the drive portion is at a greater distance from the output spindle than the first end of the drive motor,
wherein the reciprocating saw has a handle that, with the output spindle, is configured to form an obtuse angle, and
wherein the first angle and the obtuse angle are disposed in one plane and on one side of the output spindle, such that the drive motor is disposed beneath the output spindle.

2. The reciprocating saw as claimed in claim 1, wherein:
the output spindle has a fastening portion configured to fasten to a saw,
the drive motor has a drive portion connected to the transmission and has a first end distant from the transmission, and
the first end of the drive motor that is distant from the transmission is disposed closer to the fastening portion than the drive portion connected to the transmission.

3. The reciprocating saw of claim 1, further comprising a housing including:
a receiving region configured to receive the output spindle; and
a grip portion having a bulged portion configured to accommodate the drive motor, which is located beneath the receiving region,
wherein the receiving region and the bulged portion have an oval cross-sectional area defined in a plane that is perpendicular in relation to a longitudinal axis of the output spindle and configured to at least partially surround the drive motor and the output spindle.

4. The reciprocating saw as claimed in claim 1, wherein the first angle is between 5° and 30°.

5. The reciprocating saw as claimed in claim 1, wherein the transmission includes a wobble plate assembly disposed on a transmission shaft that extends parallelwise in relation to the longitudinal axis of the drive motor.

6. The reciprocating saw as claimed in claim 5, wherein the transmission shaft is located in a gap formed by the drive motor and the output spindle.

7. The reciprocating saw as claimed in claim 5, wherein:
the wobble plate assembly has a first portion disposed around the transmission shaft and a second portion configured to engage in the output spindle, and
the first portion and the second portion form a second angle equal to the first angle subtracted from 180°.

8. The reciprocating saw of claim 1, further comprising:
a fastening portion on the output spindle configured to fasten to a saw;
a housing including a receiving region configured to receive the output spindle and a grip portion configured to accommodate the drive motor;
a support device removably mountable to the housing and including a support element that delimits a receiving region to receive a workpiece for engagement with a saw fastened to the output spindle.

9. The reciprocating saw of claim 8, wherein the support device is U-shaped with the spindle axis passing through the U-shape when the support device is mounted to the housing.

10. The reciprocating saw of claim 9, wherein the support device includes:
a fastening element configured to be removably mounted to the housing;
a pair of support elements defining the U-shape of the support device and disposed at an angle relative to each other to define the receiving region therebetween; and
a pair of elongated carrier elements, each carrier element pivotably connected at one end to the fastening element and attached at an opposite end to at least one of the pair of support elements on a corresponding side of the U-shape.

11. The reciprocating saw of claim 10, further comprising a biasing spring disposed at the pivotable connection of the carrier elements to the fastening element, the biasing spring adapted to bias the support elements toward the workpiece received within the receiving region.

12. A reciprocating saw, comprising:
a reciprocating-motion output spindle; and
a drive motor,
wherein the output spindle and the drive motor are coupled to each other via a transmission, the drive motor including a drive portion connected to the transmission and a first end distant from the transmission, and
wherein a longitudinal side of the output spindle and a longitudinal side of the drive motor extend next to each other such that the drive motor is disposed next to the output spindle, and
wherein the longitudinal axis of the drive motor and the longitudinal axis of the output spindle intersect at a first angle on a side that is distant from the transmission such that the drive motor and the output spindle are inclined such that the drive portion is at a greater distance from the output spindle than the first end of the drive motor.

13. The reciprocating saw as claimed in claim 12, wherein the first angle is between 5° and 30°.

14. The reciprocating saw as claimed in claim 13, wherein the first angle is between 15° and 20°.

15. The reciprocating saw as claimed in claim 14, wherein the first angle is between 17°.

16. The reciprocating saw as claimed in claim 12, wherein the transmission includes a wobble plate assembly disposed on a transmission shaft that extends parallelwise in relation to the longitudinal axis of the drive motor.

17. The reciprocating saw as claimed in claim 16, wherein the transmission shaft is located in a gap formed by the drive motor and the output spindle.

18. The reciprocating saw as claimed in claim 16, wherein:
the wobble plate assembly has a first portion disposed around the transmission shaft and a second portion configured to engage in the output spindle, and
the first portion and the second portion form a second angle equal to the first angle subtracted from 180°.

19. The reciprocating saw as claimed in claim 12, wherein the reciprocating saw has a handle that, with the output spindle, is configured to form an obtuse angle.

20. The reciprocating saw of claim 12, further comprising a housing including:
a receiving region configured to receive the output spindle; and
a grip portion having a bulged portion configured to accommodate the drive motor, which is located beneath the receiving region,
wherein the receiving region and the bulged portion have an oval cross-sectional area defined in a plane that is perpendicular in relation to a longitudinal axis of the output spindle and configured to at least partially surround the drive motor and the output spindle.

21. A reciprocating saw, comprising:
a reciprocating-motion output spindle; and
a drive motor,
wherein the output spindle and the drive motor are coupled to each other via a transmission, the drive motor including a drive portion connected to the transmission and a first end distant from the transmission, and
wherein a longitudinal side of the output spindle and a longitudinal side of the drive motor extend next to each other such that the drive motor is disposed next to the output spindle,
wherein the longitudinal axis of the drive motor and the longitudinal axis of the output spindle intersect at a first angle on a side that is distant from the transmission such that the drive motor and the output spindle are inclined such that the drive portion is at a greater distance from the output spindle than the first end of the drive motor,
wherein the transmission includes a wobble plate assembly disposed on a transmission shaft that extends parallelwise in relation to the longitudinal axis of the drive motor, the transmission shaft mounted in a cantilever manner in a gap formed by the drive motor and the output spindle.

\* \* \* \* \*